United States Patent
Siebelhoff et al.

[11] 3,767,341
[45] Oct. 23, 1973

[54] BLOW MOULDING MACHINE

[75] Inventors: Bernd Siebelhoff, Solingen; Josef Senel, Bonn-Beuel, both of Germany

[73] Assignee: Rheinmetall GmbH, Dusseldorf, Germany

[22] Filed: Apr. 8, 1971

[21] Appl. No.: 132,301

[52] U.S. Cl............ 425/150, 91/171, 425/DIG. 205
[51] Int. Cl.............................................. B29d 23/03
[58] Field of Search................ 425/326 B, 387, 150, 425/167, 168, 450, 451, DIG. 205; 264/40; 100/258 R, 258 A; 60/97 E; 91/171, 189

[56] References Cited
UNITED STATES PATENTS

| | | | |
|---|---|---|---|
| 3,484,897 | 12/1969 | Kovacs | 425/326 B |
| 3,370,322 | 2/1968 | Nowicki | 425/387 B |
| 2,380,973 | 8/1945 | Kopp | 91/171 |
| 2,969,647 | 1/1961 | Raymond | 91/171 |
| 2,309,944 | 2/1943 | Flowers | 425/150 X |
| 2,378,497 | 6/1945 | Phillips | 91/171 |
| 2,441,925 | 5/1948 | Wege | 91/171 |
| 3,355,993 | 12/1967 | Williamson | 91/171 |
| 3,396,427 | 8/1968 | Raspante | 425/326 B X |
| 3,647,341 | 3/1972 | Fischer | 425/168 X |

Primary Examiner—H. A. Kilby, Jr.
Attorney—Watson, Cole, Grindle & Watson

[57] ABSTRACT

In a moulding machine having a blow moulding nozzle and a closing and opening frame for mould parts, each activated by a hydraulic cylinder, the cylinders being hydraulically connected in parallel and a centering device being provided for the moulded parts. The centering device is capable of indicating the position of at least one of the mould parts relative to its intended position in its closed state. Also, the centering device is capable of displacing each of the mould parts in the same direction as a function of such indicating position.

12 Claims, 1 Drawing Figure

PATENTED OCT 23 1973
3,767,341
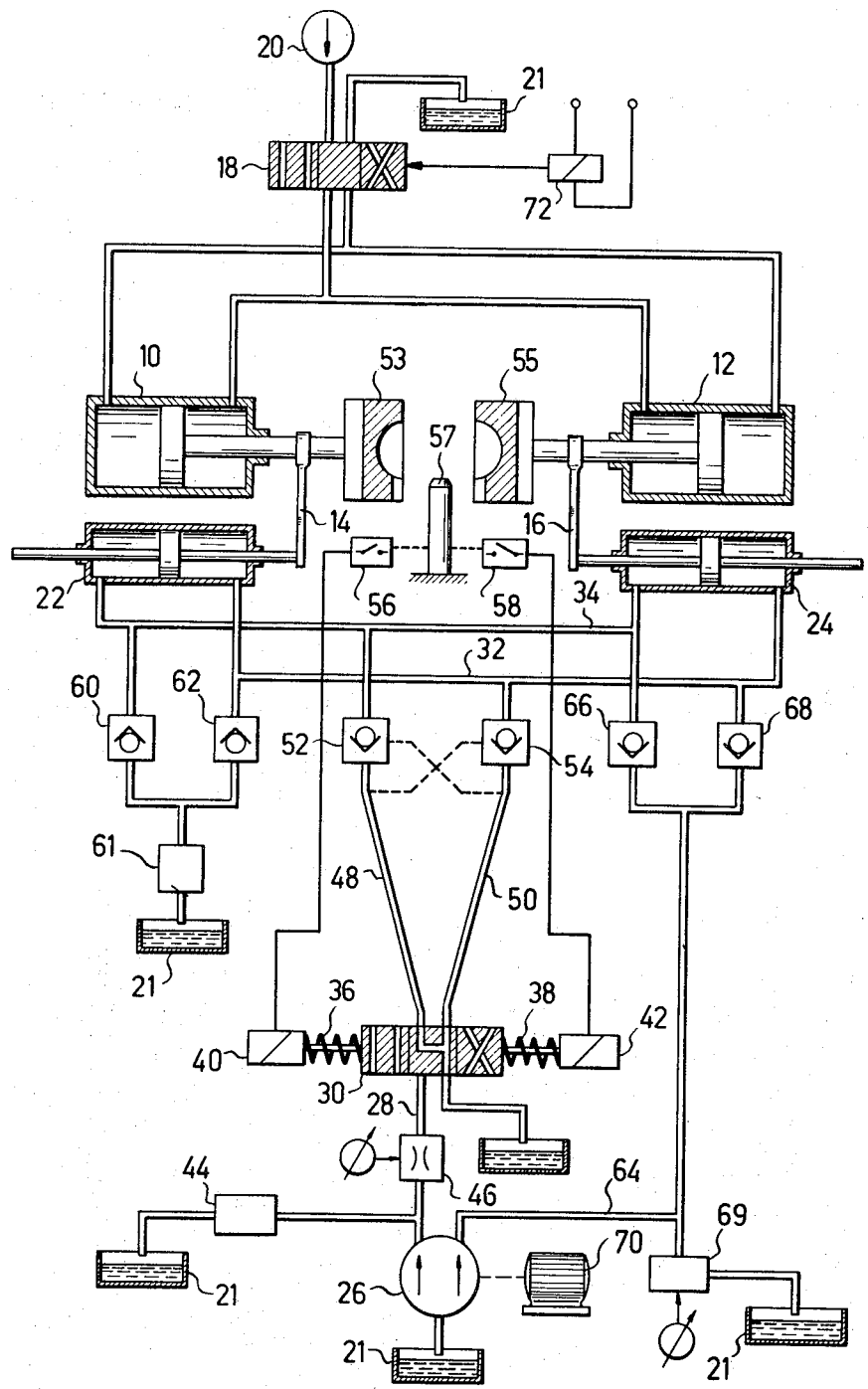
INVENTORS,
BERND SIEBELHOFF
JOSEF SENEL
BY:
Watson, Cole, Grindle & Watson
ATTORNEYS

BLOW MOULDING MACHINE

This invention relates to a moulding machine, for example blow moulding machines, with a hydraulically-actuated frame for opening and closing a multi-part mould. In a typical machine, there is one hydraulic cylinder associated with each of the frame parts which carry a part of the mould, these hydraulic cylinders being hydraulically connected in parallel and being coupled to one another so as to maintain synchronous operation. When the mould is open, a tubular blank of heat-deformable plastics material is intorduced. When the mould is closed, compressed air is blown into the blank by means of a blowing nozzle communicating with the orifice of the tube.

In known blow moulding machines of the aforementioned type, difficulties arise during actuation of the closing frame by means of the hydraulic cylinders to center the mould relative to the blowing nozzle orifice when the mould is closed. This problem is met in conventional machines by mechanically coupling the movable parts of the frame in such manner that the coupling members — for example, a chain — compensate for any force differences between the individual parts of the frame. When the machine is new, this system operates quite reliably even though the centering which is achieved may not be altogether accurate. After continued use, however, it has been found that the mould tends to become off-centered with respect to the fixed blowing nozzle due to the wear of the coupling members such that a cumulative effect of the force differences will manifest itself. Also, during closure it has been found that one or more portions of the mould may strike the contact surfaces of the blowing nozzle under force, such that both the blowing nozzle and such portions of the mould may become deformed. Furthermore, gaps may develop through which the moulding material may seep during shaping, so that the mould and possibly also the blowing nozzle would need to be repaired. Still further, the mechanical coupling members tend to complicate the construction so that the mould and the frame are not readily accessible. The mechanical coupling members also impose some limitations on the design of the machine.

In is therefore an object of the present invention to improve the blow moulding machine of the above-mentioned type so as to avoid any tendency of the mould to move off-center relative to the blowing nozzle.

A moulding machine according to the present invention has a centering device for the parts of the mould, with a measuring member for the position of at least one part of the mould relative to its intended position in the closed state, and a positioning member for displacing all parts of the mould in the same direction, as a function of the measured position.

The solution provided by the invention is based on the permise that a small differential displacement during a single stroke of the frame can be tolerated, but that the summation effect of several such differential displacements can and should be avoided.

An additional hydraulic system or compensating system is preferably employed instead of such mechanical coupling members as above referred to. The present system therefore does not suffer from the above-mentioned constructional restrictions, such as exist with mechanical coupling members. The machine has hydraulic synchronizing cylinders, the pistons of which are mechanically coupled to those of the hydraulic cylinders, while the cylinder cavities of the synchronizing cylinders communicate via pressure balancing leads which permit a balancing of the pressure for the frame movements. There is also a positioning member in the form of a pumping device for hydraulic fluid from one balancing lead into the other, or vice versa.

It should, however, be mentioned that a moulding machine according to the ivnention can, alternatively, incorporate a centering device of mechanical form operatively connected between the parts of the mould.

When the main valve for the hydraulic cylinders is opened, hudraulic medium flows behind both cylinder pistons, any difference in the flow volumes being balanced by the balancing leads of the synchronizing cylinders, thereby achieving what has previously been effected by tension in a chain in conventional machines. All the mould parts thus start to move towards the blowing nozzle, which is assumed to be fixed. The position of one or more mould parts (or of the frame members which are firmly connected therewith) is sensed in the closed state, for which purpose the measuring member is provided. If there is no signal from the measuring member, nothing happens, while if the measuring member transmits a signal, then — depending on the direction of the signal — hydraulic medium is pumped from one balancing lead into the other or vice verse, until the signal from the measuring member will disappear. As a result of the pumping, the mould parts are moved in the same direction until the desired centering is again achieved. Depending on the nature of the design, the centering can be improved by one order of magnitude, or more, as compared with the arrangement with mechanical coupling members. If an off-centering again occurs on the next stroke, the same process again takes place. The off-centering can thus not build up to a more serious deviation.

The measuring member can, for example, be a position detector connected to one or more parts of the mould. In such case the intended position must be fixed anew when making a mould change. This may be not necessary if the measuring member is connected to the blowing nozzle and its mechanical displacement as a result of premature arrival of a mould part is evaluated. Additionally, errors in setting-up are automatically balanced if they are based on an incorrect position of the blowing nozzle or of a carriage on which the nozzle rests. The measuring signal can, in a simple case, be generated by allocating to each mould part a switch contact on the nozzle, which closes (or opens) if the blowing nozzle is displaced and hence actuates a control valve for the pumping process. If greater accuracy is required, it is also possible to provide a detecting element on the blowing nozzle, the detector signal being proportional to the magnitude of the displacement and permitting the volume flow rate on pumping to be controlled accordingly. Such mechanical-electrical transducers are extensively known, for example on train guages, piezo-electric elements and the like.

The positioning member is, in a preferred embodiment of the invention incorporating an additional hydraulic balancing system, formed by an additional auxiliary pump with a control valve actuated in accordance with the signals from the measuring member. The use of such an additional pump therefore has the advantage that variations through changes of volume in the balancing supplies, for example as a consequence of temperature changes or leaks, can also be balanced in a simple manner. Such balancing may be easily achieved in the following manner. The control valve works on the on-off principle for a simple system with switch contacts, or the valve can permit a variable flow, which is to be preferred in the case of proportional control with a proportional signal generator as the measuring member. Equally, it is also possible to subject a control valve working on the on-off principle to control signals of differing duration, depending on the magnitude of the measurement signal from a proportional signal generator.

In order to reduce costs and to keep the volume which must be pumped as small as possible, a further subsidiary feature of the invention is that the synchronizing cylinders have a considerably smaller piston surface. The ratio can, for example, be between 1:2 and 1:100, the lower limit being determined by the forces which must be absorbed.

An embodiment of the invention consisting of a blow moulding machine with a two-part closing frame will now be described in greater detail with reference to the accompanying drawing which schematically represents an electrical-hydraulic block circuit of such a machine, with those components not required for an understanding of the invention being omitted.

A closing and opening frame (not shown) for mould halves 53, 55 is actuated by two hydraulic cylinders 10, 12, respectively, for which purpose piston rods 14, 16 are mechanically rigidly connected to the corresponding movable guided parts of the frame. The hydraulic cylinders 10, 12 are connected via a main valve 18 to a main pump 20, and are connected in parallel with respect to the flow of hydraulic fluid from the pump.

The main valve 18 is electrically operated and has three possible positions, namely advance (mould halves close), retract (mould halves open) and stop. When the mould is closed, the closing pressure still continues to act on the hydraulic cylinders so as to counteract any pressure inside the mould tending to open the latter. The stop position of the main valve 18 only applies to the open mould.

With the hydraulically-parallel connection, the pistons of cylinders 10 and 12 can move completely independently of one another. For this reason, the synchronizing of cylinders with balancing leads, that is to say an additional hydraulic system for synchronization, is provided. The drawing shows significantly smaller synchronizing cylinders 22 and 24, of which the piston rods are mechanically rigidly coupled via elements 14, 16 to the piston rods of the hydraulic cylinders 10 and 12.

An auxiliary pump 26 is provided which is shown as a twin pump, but it can also be constructed as a single pump. One of its pressure conduits, the conduit 28, is connected via a control valve 30, a throttle 46, pipelines 50 and 48 and non-return valves 54 and 52 to the balancing supplies 32 and 34 which connect the synchronizing cylinders 22 and 24. The control valve 30 is centered in its middle (blocking) position by means of springs 36, 38, and can be displaced into one or the other flow position by electrical control signals controlling solenoids 40 and 42, respectively. In one flow position, additional hydraulic fluid is supplied to the balancing supply 32, and in the other flow position to the balancing supply 34. The pressure at which fluid is supplied is fixed to a particular predetermined value — for example 50 atmospheres gauge — by means of an overload release 44; the flow rates are predetermined by the adjustable throttle 46.

Since the control valves which are used sometimes show leakage losses in the blocked position, the controlled non-return valves 52, 54 are provided as a safety measure in the pipes 48 and 50 from the control valve 30 to the balancing supplies 32 and 34. These normally prevent the flow of hydraulic fluid from the balancing supplies to the control valve as long as the latter is in the blocked position; if, however, its setting is changed to one or the other position, the corresponding non-return valve opens and also actuates, via a connection shown in broken lines, the other non-return valve, so that the pump 26 pumps fluid into one balancing supply, while a corresponding amount flows from the other balancing supply into the tank 21, doing so under the action of the moving pistons in the synchronizing cylinders 22, 24. It should be noted that under the action of the main pump pressure the pistons move in different directions (that is to say towards one another or away from one another). Under the action of the auxiliary pump, on the other hand, the pistons are displaced in the same direction, that is to say both mould halves 53, 55 move in the same direction.

The control signals for the solenoids are provided by a measuring member which in the drawing is indicated schematically as switch contacts 56, 58 which are located on a support for the blowing nozzle and are closed whtn the blowing nozzle 57 is displaced. They close the flow circuits for a predetermined time and hence control the feed of hydraulic fluid into the balancing leads 32 and 34. The switch contacts are directly actuated mechanically by a blowing nozzle if the latter is displaced in one or the other direction by one or the other of the mould halves 53, 55. The switch contacts can, however, also be actuated by integrating members, which are controlled by the integral of the blowing nozzle displacement over the time, measured by means of a proportional signal generator 73 on the nozzle or, alternatively, on control valve 30. Moreover, the measuring member can be an electrical position detector 74 connected to one or more parts of the mold.

It should be mentioned that an electrical transmission of position change can be dispensed with, if the blowing nozzle 57 is directly coupled mechanically with a hydraulic amplifier acting as a control valve for the hydraulic fluid. Such hydraulic amplifiers are known and their construction does not form part of the present invention.

If temperature changes occur, the pressure conditions in the hydraulic cylinders change. In order to restrict a pressure rise with increasing temperature to a safe value, the balancing supplies 32, 34 are connected to the hydraulic tank 21 via non-return valves 60 and 62 which are set to an opening pressure of, for example, 40 atmospheres gauge by means of an element 61. At the same time, this arrangement protects against overloading the hydraulic balancing system, which therefore mechanically only has to be designed for the considerably smaller balancing forces. If the full closing force, for example as a result of the mould jamming, were to transmitted to the balancing system element 61 prevents overloading. In the case of mechanical coupling members on the other hand, fracture would be expected on overloading.

When the temperature drops again, a pressure reduction would however be produced in the balancing supplies. In order to balance this, the second pressure supply 64 of the auxiliary pump 26 is connected to the balancing supplies 32, 34 via non-return valves 66, 68. The in-put pressure is restricted to a value of, for example 5 atmospheres gauge, by means of an adjustable overload release 69. Of course, it would also be possible to work with a single pump instead of a twin pump, but more complicated pressure reduction devices for the two balancing supplies would then be required. A possible uneven feed of fluid to the two balancing supplies via lead 64 can be balanced during the next stroke of the closing frame, as can an uneven feed of fluid to the tank 21.

A motor 70 is provided for driving the auxiliary pump 26 while an electro-mechanical setting device 72 serves to actuate the main valve 18.

Obviously, many modifications and variations of the present invention are possible in the light of the above teachings. It is therefore to be understood that within the scope of the appended claims, the invention may be practiced otherwise than as specifically described.

What is claimed is:

1. In a moulding machine having a blow moulding nozzle and a closing and opening frame for mould parts, each actuated by a hydraulic cylinder, said cylinders being hydraulically connected in parallel, a centering device being provided for said mould parts, said device having a member for indicating after arrival in the closed state of said mould parts the position of at least one of said mould parts relative to its intended position in the closed state, and said device having a positioning means for displacing said closed mould parts in the same direction toward the intended position in the closed state as a function of said indicated position, said positioning means including hydraulic synchronizing cylinders having movable pistons which are respectively coupled with those of said hydraulic cylinders, the cylinder cavities of each said sychronizing cylinder intercommunicating via respective hydraulic fluid balancing supply means for balancing the hydraulic pressure effecting closing movements of said mould parts, there being also means provided for pumping hydraulic fluid from one of said supply means to the other.

2. The machine according to claim 1 wherein means are provided for controlling said pumping means, said control means being associated with each of said mould parts and capable of being activated by movement of said nozzle during its lateral movement.

3. The machine according to claim 1 wherein said indicating member is so arranged as to generate an electrical control signal proportional to the movement of said nozzle during its lateral movement, and said indicating member being connected with said nozzle.

4. The machine according to claim 1 in which said indicating member is an electrical position detector connected to one of said mould parts.

5. The machine according to claim 1 in which there is provided an additional hydraulic pump having a pressure line and suction line selectively connectable to said balancing supply means by a control valve actuable under the control of said indicating member.

6. The machine according to claim 2 in which there is provided an additional hydraulic pump having a pressure line and suction line selectively connectable to said balancing supply means by a control valve actuable under the control of said indicating member.

7. The machine according to claim 3 in which there is provided an additional hydraulic pump having a pressure line and suction line selectively connectable to said balancing supply means by a control valve actuable under the control of said indicating member.

8. The machine according to claim 5 in which said pressure line is connected to each of said balancing supply means in parallel with said control valve via a pressure overload release device and non-return valves of low opening pressure, and in which said balancing supply means are connected to the tank of said additional pump in parallel to said control valve, via non-return valves of high opening pressure.

9. The machine according to claim 8 in which non-return valves for leakage losses are provided between said control valve and said balancing supply means.

10. The machine according to claim 6 in which said control valve possesses a blocked position and a pressure transmission position connectable to each respectively said balancing supply means, and in which a change-over of said control valve into the transmission position is effected in response to actuation of said controlling means.

11. The machine according to claim 7 in which said indicating member is connected to said control valve and in which the volume of hydraulic fluid fed by said additional pump via said control valve is adjustable as a function of the magnitude of said control signal.

12. The machine according to claim 1 in which the piston surfaces of said hydraulic cylinders are about twice as large as those of said synchronizing cylinders.

* * * * *

UNITED STATES PATENT OFFICE
CERTIFICATE OF CORRECTION

Patent No. 3,767,341     Dated October 23, 1973

Inventor(s) Bernd Siebelhoff and Josef Senel

It is certified that error appears in the above-identified patent and that said Letters Patent are hereby corrected as shown below:

In the title page, insert --Claims priority

Germany     P 20 20 290.8, filed April 25, 1970--

Signed and sealed this 16th day of April 1974.

(SEAL)
Attest:

EDWARD M. FLETCHER, JR.
Attesting Officer

C. MARSHALL DANN
Commissioner of Patents